United States Patent
Van Ryzin

[19]

[11] Patent Number: 6,052,471
[45] Date of Patent: Apr. 18, 2000

[54] SMART AUDIO RECEIVER THAT AUTOMATICALLY SELECT AN INPUT AUDIO SOURCE

[75] Inventor: John M. Van Ryzin, Madison, N.J.

[73] Assignees: Sony Corporation, Tokyo, Japan; Sony Electronics Inc., Park Ridge, N.J.

[21] Appl. No.: 09/074,741

[22] Filed: May 8, 1998

[51] Int. Cl.[7] .............................. H04R 27/00; H02B 1/00; H04B 1/20; H04Q 3/00
[52] U.S. Cl. ................................ 381/85; 381/123; 369/2; 340/825.5
[58] Field of Search ................................ 381/119, 77, 81, 381/85, 123; 340/825.51, 825.5; 369/2

[56] References Cited

U.S. PATENT DOCUMENTS

| | | | |
|---|---|---|---|
| 3,922,641 | 11/1975 | Gates, Jr. ............................ | 340/825.04 |
| 3,956,591 | 5/1976 | Gates, Jr. ..................................... | 369/2 |
| 4,347,510 | 8/1982 | Ishigaki et al. ....................... | 340/825.5 |
| 4,691,361 | 9/1987 | Yoshino et al. ............................ | 381/81 |
| 4,763,012 | 8/1988 | Blankinship ............................... | 307/43 |
| 5,155,770 | 10/1992 | Maejima ..................................... | 381/18 |
| 5,307,456 | 4/1994 | MacKay ..................................... | 395/154 |
| 5,532,753 | 7/1996 | Buchner et al. ........................ | 348/569 |
| 5,606,443 | 2/1997 | Sgambati ................................... | 359/143 |

*Primary Examiner*—Forester W. Isen
*Assistant Examiner*—Brian Tyrone Pendleton
*Attorney, Agent, or Firm*—Christopher M. Tobin

[57] ABSTRACT

Receiver control circuitry of a receiver automatically detects, selects, and enables a priority signal provided to the receiver from a plurality of audio and/or visual source devices. Upon the user starting a source device that serves as a potential source of audio and/or visual input signals to the receiver, the receiver control circuitry automatically determines whether the receiver should switch to the source device as its source of audio and/or visual information. Additionally, the receiver control circuit will automatically turn on the receiver if it is not powered-up so that this will not have to be done by the user of the receiver.

25 Claims, 3 Drawing Sheets

AUDIO/INPUT SIGNAL PRIORITY DECISION TABLE

| PRIORITY | OTHER | PHONO | AM/FM | TAPE | CD | VID2 | VID1 | OUTPUT | |
|---|---|---|---|---|---|---|---|---|---|
| 1 | X | X | X | X | 1 | X | X | CD | 76 |
| 2 | X | X | X | 1 | X | X | X | TAPE | 78 |
| 3 | X | X | 1 | X | X | X | X | AM/FM | 80 |
| 4 | X | 1 | X | X | X | X | X | PHONO | 82 |
| 5 | 1 | X | X | X | X | X | X | OTHER | 84 |
| 6 | X | X | X | X | X | 0 | 1 | VID1 | 72 |
| 7 | X | X | X | X | X | 1 | X | VID2 | 74 |

X = DO NOT CARE
1 = SIGNAL EXISTS
0 = SIGNAL DOES NOT EXIST 6,052,471

SMART AUDIO RECEIVER THAT AUTOMATICALLY SELECT AN INPUT AUDIO SOURCE

FIELD OF THE INVENTION

This invention relates generally to receivers capable of receiving multiple audio and/or visual input signals and, more particularly, to a structure and a method for the automatic detection, selection, and enablement of a priority input signal from multiple input signals provided to the receiver.

BACKGROUND OF THE INVENTION

Receivers that are capable of receiving and processing an audio signal and/or visual input signal are well known in the art. Receivers are regularly used in audio, visual, and audio/visual applications such as audio/visual stereo systems, public address (PA) systems, and musical recording studios, for instance. As audio, visual, and audio/visual application have become more sophisticated, so have the receivers used in them. Receivers are now characterized as having multiple possible input signals, whether these input signals be audio, visual, or some combination thereof.

Consider, for instance, a receiver for use in home audio/visual stereo systems. Such a receiver is characterized as having many different possible input audio sources. For instance, compact disc (CD) players, stereo/surround television, stereo/surround VCRs, stereo/surround laser and digital video disc (DVD) players, stereo/surround direct satellite system (DSS) are all components of an audio/visual stereo system capable of providing audio and/or visual input signals to the receiver for processing. A surround sound system might further add to the number of audio inputs being supplied to a receiver of an audio/visual stereo system.

As the number of sources possibly supplying audio and visual input signals to a receiver increases, the difficulty of determining which input signal is to be given priority by the receiver over other input signals becomes apparent. New audio and/or visual sources create additional user interface commands to select an appropriate input signal source. Consider, for example, a home stereo system user who is watching cable TV but then decides to start a VCR movie. Currently, user intervention is required to ensure that the receiver selects the new, appropriate VCR audio input signal over the audio cable signal that it is now selected to receive. The user must start the VCR and then switch the receiver's selected audio source from cable to the VCR, either manually or by remote control.

It is known in the art that certain home stereo systems that employ cable-linked components, such as components that use the Sony S-LINK®, can automatically switch the input source on the receiver when the user starts a linked device. For example, if the user presses play on a CD player in such a system this causes the receiver to switch to the CD player as the audio source. However, this approach does not work with non-cable-linked devices or with all manufacturer's device.

In light of the above discussion, there is an unmet need in the art for a receiver to be able to readily select the appropriate input source, whether it be an audio source or a visual source. It is desirable that this capability be accomplished without the requirement that input sources be cable-linked. It is further desirable that the selection of the appropriate input source be transparent to the user of the system such that no interaction from the user is required to accomplish mplish the selection and that the selection occur within a short and therefore unnoticeable period of time.

SUMMARY OF THE INVENTION

It is accordingly an object of the invention for a receiver capable of receiving input signals from multiple sources, such as audio and/or visual sources, to be able to readily switch to an appropriate source of the multiple sources while requiring a minimum amount of user intervention.

It is further an object of the invention that switching the receiver to the appropriate source of many sources be conducted in a manner that is transparent to the user of the receiver.

Therefore, according to the present invention, a method and structure for the automatic detection, selection, and enablement of a priority source signal from a plurality of source signals presented to the receiver is presented. In a receiver suitable for use in audio/visual systems, receiver control circuitry automatically detects, selects, and enables the priority source signal to the receiver from one or more source signals of the type generated by audio/visual devices that have been presented to the receiver for a minimum, uninterrupted period of time. The receiver control circuitry has a plurality of signal detect elements, a priority logic circuit, first and second selection elements, a plurality of source switches, and a disable element.

Each signal detect element is assigned to a source signal for the purpose of detecting whether the source signal is presented to the receiver for the minimum, uninterrupted period of time. Only when a source signal has been detected by its signal detect element is it passed by the signal detect element to the priority logic circuit. The priority logic circuit determines which source signal from all of the source signals passed to it has the highest priority and is therefore the priority source signal. Priority is determined according to a priority table or priority logic of the priority logic circuit and the priority logic circuit generates a priority code that indicates the priority source signal. The priority code is typically a binary code and is received by the first selection element which uses the code to select and pass the priority source signal to the second selection element. The plurality of source switches is capable of generating a switch signal when a switch of the plurality of source switches is activated. The switch signal is received by the second selection element. Now, whether the second selection element enables the priority source signal or the switch signal as its output signal is determined by whether the disable switch of the receiver has been activated. Until the disable switch has been activated, the second selection element operates to enable the priority source signal, passing it through to pre-amplifier circuitry of the receiver. If, however, the disable switch has been activated, then the priority source signal is disabled and the second selection element enables the switch signal, passing it through to pre-amplifier circuitry of the receiver.

According to another feature of the present invention a logic element of the receiver control circuitry provides for the receiver to be automatically powered-up after one or more source signals have been presented to the receiver for the minimum, uninterrupted period of time. A signal is sent to the receiver power enable circuitry to accomplish the powering-up of the receiver. The signal is additionally sent to volume limiting circuitry to ensure that upon powering-up the receiver, the volume is not too high. This aspect of the invention saves the user of the receiver the trouble of having to manually turn on the receiver if it is off and also prevents the user from being "blasted" by too high a volume upon powering-up of the receiver.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The receiver of the present invention overcomes the prior art difficulties by automatically detecting, selecting and enabling an appropriate input signal source, either an audio or a visual source, to a receiver presented with multiple input source signals. Upon the user starting a desired source device, such as a compact disc (CD) player, stereo/surround television, a stereo/surround VCR, a stereo/surround laser and digital video disc (DVD) player, a stereo/surround direct satellite system (DSS), or any other potential source of audio and/or visual input signals to the receiver, the receiver is able to selectively determine, according to a priority decision capability, whether the receiver should switch to the desired device as its source of audio and/or visual information. In addition, if the receiver was turned off prior to the user starting a desired device, the receiver will power-up and the select the desired device as its source of audio and/or visual information. This feature of the present invention saves the user time and the effort normally required to turn on the receiver prior to turning on the desired device. The user can override the automatic detection performed by the receiver by a disable switch on the receiver so that the receiver operates in the manner of the prior art, if so desired.

Figure 1:
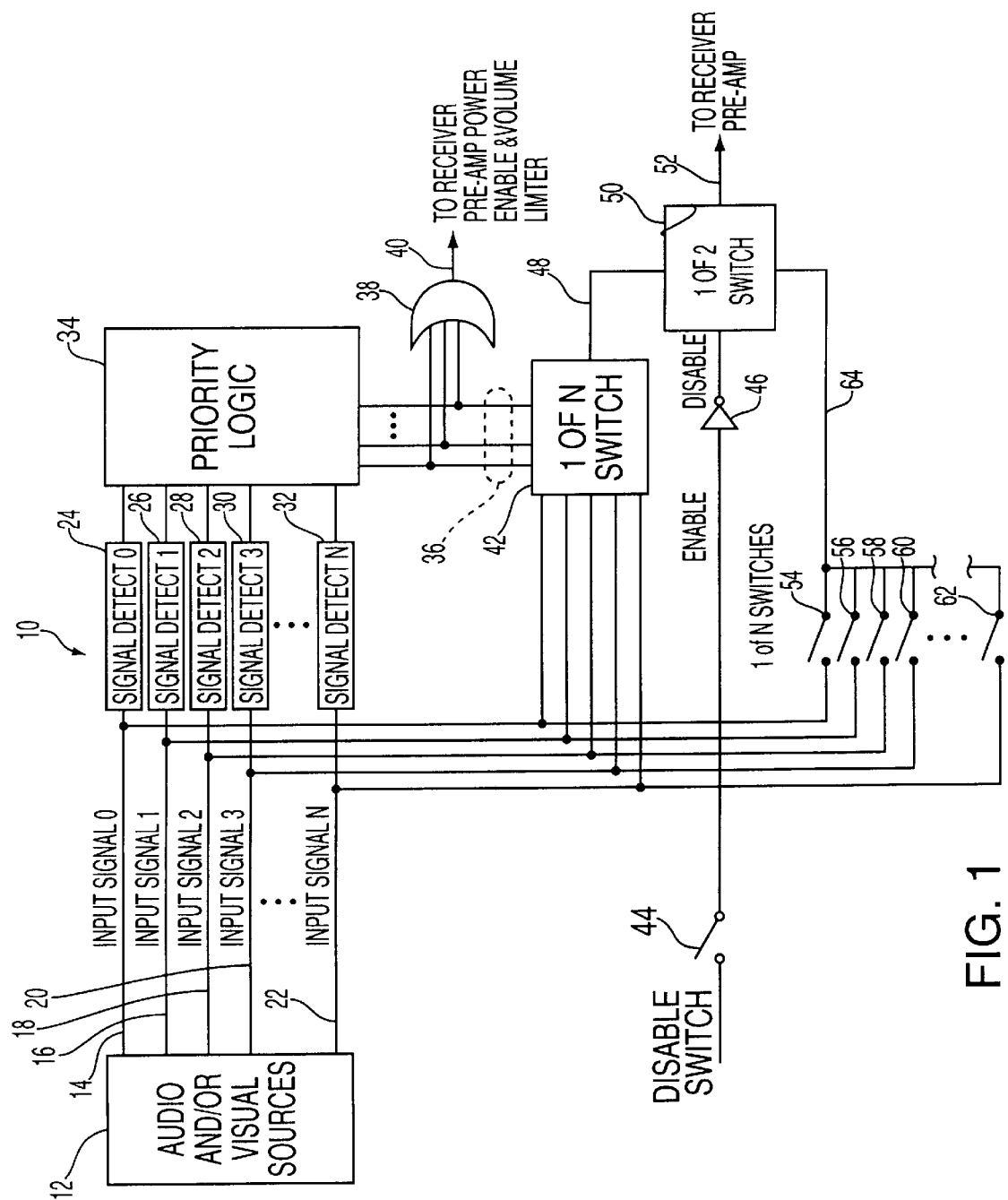
FIG. 1 is a block diagram of a system having a receiver containing receiver control circuitry that is presented with multiple input source signals, according to the present invention.

Referring now to FIG. 1, a block diagram 10 of a system containing receiver control circuitry, according to the present invention, is shown. Block 12 represents any number of audio and/or visual sources, from one to N, that are capable of producing input signals to the receiver, shown as Input Signal0 14, Input Signal1 16, Input Signal2 18, Input Signal3 20 . . . Input SignalN 22. Signal Detect blocks 24, 26, 28, 30, and 32 detect any signal provided by an audio or visual source of block 12. After an input signal has been detected for a given, uninterrupted period of time, the signal detect block will enable the input signal to be passed through to Priority Logic block 34. Suppose, for instance, that Signal Detect0 24 detects an audio input signal 14. After Signal Detect0 24 has detected an uninterrupted Input Signal0 14 for a given period of time, such as 0.5 S, it will pass through Input Signal0 14 to Priority Logic block 34.

Priority Logic block 34 operates to determine which of the detected input signals 14 to 22 will be selected to be the input signal that is given priority over any other input signals received by the receiver. The output lines 36 of Priority Logic block 34 are binary coded to instruct Switch 42 to select the correct input signal of Input Signals0–N that is passed through Switch 50 to the pre-amplifier circuitry of the receiver as signal 52 so long as the Disable Switch 44 has not been activated. The appropriate switch of 1 of N switches 54–62 is thrown to enable the selected input signal to be an input signal to switch 50. The number of output lines 36 is chosen in order to provide binary coding options for the number of Input Signals0–N 14–22. For instance, to cover up to four input signals, only two output lines 36 is needed in order to come up with the requisite eight binary combinations indicative of the input signal to be given priority: 00, 01, 10, 11. Similarly, to cover up to eight input signals, three output lines 36 would be required to cover the following possible binary combinations: 00, 01, 10, 11, 100, 101, 110, 111. Unless Disable Switch 44 is activated the priority Input Signal 48 from Switch 42 is selected and passed by Switch 52 as output signal 52 to the receiver pre-amplifier circuitry. If, however, Disable Switch 44 is activated to disable the automatic detection, selection, and enablement of the priority input signal, then the Input Signal0–N 14–22 indicated by the 1 of N switches 54–62 that is thrown is signal 64 and is passed by Switch 50 as output signal 52.

The Priority Logic block 34 may have a fixed priority level for each different type of input signal reflected in a priority table of Priority Logic block 34. Alternately, the priority assigned to different types of input signals may be changed as desired by the user. Thus a priority table of the type shown in FIG. 3, for instance, may be created and edited by the user. This could be accomplished using key entries on the receiver. The priority table of Priority Logic block 34 could be implemented with circuitry or by a microprocessor and firmware. Such firmware could alter the priority table based upon which device was just turned on. For example, the firmware could change the priority table to give the highest priority to the newest device turned on. Therefore, if a CD player, having the highest priority, is played and the user then turns on the TV, the highest priority would be given to the newest signal, in this case the TV signal. This would cause the TV signal to be given priority over the CD player signal, even though previously the priority table gave a higher priority to the CD player signal.

All of the blocks, with the exception of audio and/or visual sources block 12 are part of the receiver. Disable switch 44, used to selectively disable the automatic selection of an input signal from an audio and/or visual source having priority, is accessible to the receiver user and is used to disable the automatic selection and enabling mechanisms of the present invention.

Another feature of the present invention is reflected by a logic gate, shown as OR gate 38 in the figure. If the receiver is turned off when the user started a new audio or visual source device, the logic gate 38 receives input signals 36 from Priority Logic block 34 and generates a signal 40 that is sent to the power enable circuitry of the receiver to power-up the receiver and to volume limiter circuitry to ensure that the volume delivered to speakers by the receiver is not so large as to damage the speakers and cause the user to be uncomfortable. Volume limiter circuitry limits the amount of power produced and provided to speakers, thereby preventing "blow-out" of the speakers or the listener's eardrums. It is noted that of course the receiver must be on prior to selecting and enabling the input signal that has priority as determined by Priority Logic block 34. Automatically turning on the receiver if it is off prevents the user from having to turn on the receiver, thereby saving the user the time and effort required to operate a remote control or operate buttons on the receiver.

Figure 2:
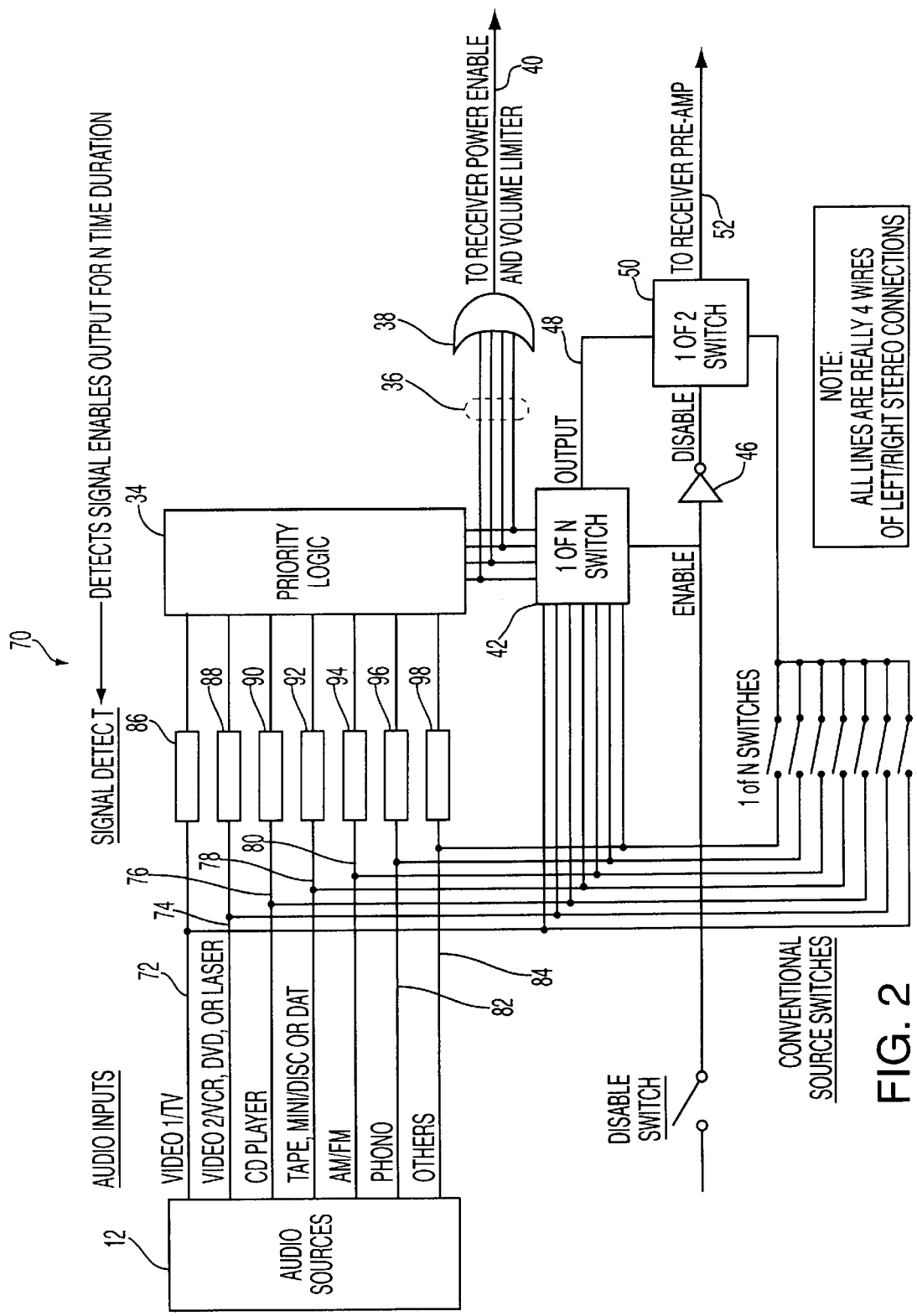
FIG. 2 is a block diagram of a system having a receiver containing receiver control circuitry that is presented with multiple audio input source signals, according to the present invention.

Referring now to FIG. 2, an example of how the invention might be used for detecting, selecting, and enabling an audio source input signal having priority over other input signals is shown. As indicated in the figure, all signal lines are representative of the four wires that comprise the right and left stereo connections. While this example discloses audio input sources, as previously mentioned the present invention may also be used to detect, select and enable appropriate visual input signals to the receiver as well.

The audio sources of block 12 in this example are capable of producing seven representative audio input signals for the receiver: video1 signal 72 produced by a source such as a TV, video2 signal 72 produced by a source such as a VCR, DVD player, or laser disc player, CD player signal 76, signal 78 produced by a tape, mini-disc, or DAT player, an AM/FM stereo signal 80, an phonograph signal 82, and other signal types 84. These audio input signals are just examples and many others may be used instead of, or in addition to, other types of input signals produced by audio and/or visual sources.

Each input signal 72–84 is detected by respective Signal Detect blocks 86–98. As previously stated, any audio signal that is detected uninterrupted for a minimum period of time is passed through to Priority Logic block 34. Priority Logic block 34 will then determine which of the detected input signals 72–84 has priority and will be provided to the receiver pre-amplifier circuitry as signal 52. As previously mentioned priority logic of block 34 could be accomplished by circuitry or by a microprocessor/firmware combination that provides programmability.

Figures 3, 4:
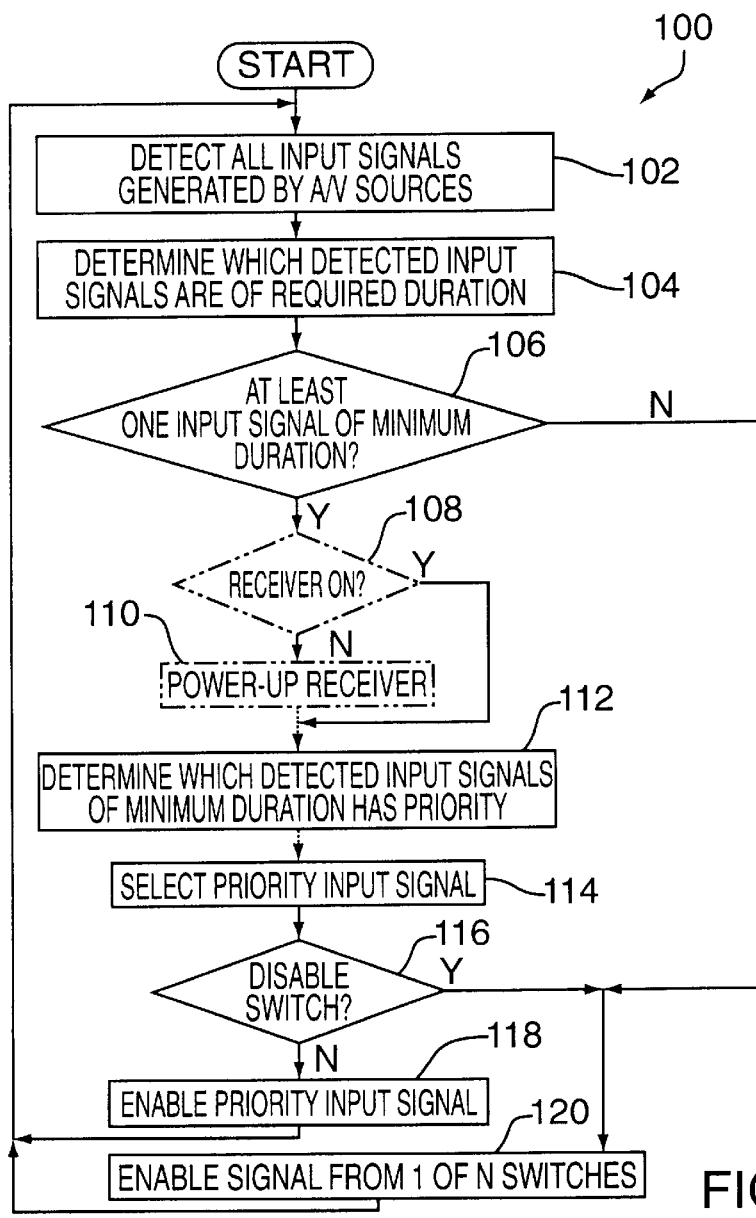
FIG. 3 is an example of a priority decision table, according to the present invention.
FIG. 4 is a flow chart of the methodology for automatically detecting, selecting and enabling a priority source signal, according to the present invention.

An example of a priority decision table is shown in the table of FIG. 3. As can be seen in this example of a priority decision table, CD player input signal 76 has the highest priority, followed by the other signals in this order: signal 78, AM/FM signal 80, phonograph signal 82, other signal 84, video 1 signal 72 and video 2 signal 74. As indicated by the legend of FIG. 3, X is representative of a "do not care" situation, 1 is representative that the signal exists, and 0 is representative that the signal does not exist. It is interesting to note that when both a video 1 signal 72 and a video 2 signal 74 are detected, the priority table dictates that the video2 signal 74 has priority over the video1 signal 72. Video2 signal 74, typically provided by a VCR, DVD, or laser disc, is a stereo audio signal that is given priority over the TV signal of video1 signal 72.

The methodology of the present invention is illustrated in the flow chart 100 of FIG. 4. The portion of the flow indicated by dashed lines is an optional part of the invention that may or may not be implemented. Referring first to Block 102, all input signals generated by audio and/or visual source devices are detected. This detection is performed by Signal Detect blocks 24–32 shown in FIGS. 1 and Signal Detect blocks 86–98 of FIG. 2. Next, at Block 104 it must be determined whether each of the detected signals is characterized as being of a minimum duration. At least one detected signal must be detected for a minimum duration in order to trigger the receiver control of the present invention, as shown at Decision Block 106. If no signal is detected for the required minimum, uninterrupted period of time, then the flow goes to Block 120, to be discussed below.

If at least one input signal has been detected, uninterrupted, for the minimum length of time, then the optional steps of Blocks 108–110 may be taken; otherwise, the flow continues to Block 112. At Decision Block 108, it must be determined whether the receiver itself is powered-up. If it is not on, it is powered-up at Block 110. As previously discussed, automatically powering-up the receiver saves the user time and effort. Additionally, it is done in such a manner as to limit the volume as previously discussed. Next, at Block 112, it is determined which of the detected input signal(s) having the requisite minimum duration has priority and will therefore be provided to the receiver. At Block 114, the priority input signal is selected. After the priority input signal has been selected, the inquiry at Decision Block 116 is whether Disable Switch 44 has been activated to disable the Switch 50 from sending the priority input signal to the pre-amplifier circuitry of the receiver. As shown in FIGS. 1 and 2, so long as Disable Switch 44 has not been activated then Switch 50 is enabled to pass the priority input signal through as signal 52 to the pre-amplifier circuitry of the receiver, as shown at Block 118, and the flow repeats to Block 102. If, however, Disable Switch 44 has been activated, then the signal 64 from 1 of N switches 54–62 is selected and passed by Switch 50 as signal 52 to the pre-amplifier circuitry of the receiver, as illustrated at Block 120. The flow then loops back to Block 102.

While the invention has been particularly shown and described with reference to a preferred embodiment, it will be understood by those skilled in the art that various changes in form and detail may be made therein without departing from the spirit and scope of the invention.

What is claimed is:

1. Receiver control circuitry of a receiver that automatically detects, selects, and enables a priority input source signal of the receiver, comprising:

a plurality of signal detect elements with each signal detect element of the one or more signal detect elements assigned to detect a respective source signal of a plurality of source signals generated by a source of a plurality of sources, wherein each signal detect element will pass its respective source signal after detecting the respective source signal for a minimum, uninterrupted period of time;

a priority logic circuit coupled to the plurality of signal detect elements that receives one or more source signals passed by the plurality of signal detect elements, determines a priority source signal of the one or more source signals, and generates a code indicative of the priority source signal;

a first selection element that receives the plurality of source signals and the code generated by the priority logic circuit, selects the priority source signal determined by the code, and outputs the priority source signal as an output signal;

a plurality of source switches with each source switch of the plurality of source switches coupled to a source signal of the one or more source signals, wherein when a source switch of the plurality of source switches is activated the source signal coupled to the activated source switch is passed by the plurality of source switches;

a second selection element that receives the priority source signal from the first selection element and the source signal from the plurality of source switches; and a disable element coupled to the second selection element, wherein the second selection element passes the priority source signal from the first selection element unless the disable element is activated in which case the second selection element passes the source signal from the plurality of source switches.

2. The circuitry of claim 1, further comprising:

a logic element that receives the output code and generates a logic output signal that is received by a power enable circuit of the receiver to power-up the receiver if it is not powered-up and that is received by a volume limiter circuit of the receiver to limit a power output of the receiver upon power-up of the receiver.

3. The circuitry of claim 1, wherein the priority logic circuit determines the priority source signal according to a priority table.

4. The circuitry of claim 3, wherein the priority table may be selectively changed using key entries of the receiver.

5. The circuitry of claim 3, wherein the priority table is implemented in circuitry.

6. The circuitry of claim 3, wherein the priority logic circuit has a processor and the priority table is implemented in firmware.

7. The circuitry of claim 1, wherein the code is a binary code.

8. The circuitry of claim 1, wherein the first selection element is a first switch element and the second selection element is a second switch element.

9. A system having a receiver with control circuitry that automatically detects, selects and enables a signal provided to the receiver that has priority over other signals provided to the receiver, said system comprising:

a plurality of sources, with each source of the plurality of sources capable of generating a source signal; and a receiver, with the receiver having a control circuit, said control circuit comprising:

a plurality of signal detect elements with each signal detect element of the one or more signal detect elements assigned to detect a respective source signal generated by a respective source of the plurality of sources, wherein each signal detect element will pass its respective source signal after detecting the respective source signal for a minimum, uninterrupted period of time;

a priority logic circuit coupled to the plurality of signal detect elements that receives one or more source signals passed by the plurality of signal detect elements, determines a priority source signal of the one or more source signals, and generates a code indicative of the priority source signal;

a first selection element that receives the plurality of source signals and the code generated by the priority logic circuit, selects the priority source signal determined by the code, and outputs the priority source signal as an output signal;

a plurality of source switches with each source switch of the plurality of source switches coupled to a source signal of the one or more source signals, wherein when a source switch of the plurality of source switches is activated the source signal coupled to the activated source switch is passed by the plurality of source switches;

a second selection element that receives the priority source signal from the first selection element and the source signal from the plurality of source switches; and a disable element coupled to the second selection element, wherein the second selection element passes the priority source signal from the first selection element unless the disable element is activated in which case the second selection element passes the source signal from the plurality of source switches.

10. The system of claim 9, further comprising:

a logic element that receives the output code and generates a logic element output signal that is received by a power enable circuit of the receiver to power-up the receiver if it is not powered-up and that is received by a volume limiter circuit of the receiver to limit a power output of the receiver upon power-up of the receiver.

11. The system of claim 9, wherein the priority logic circuit determines the priority source signal according to a priority table.

12. The system of claim 11, wherein the priority table may be selectively changed using key entries of the receiver.

13. The system of claim 11, wherein the priority table is implemented in circuitry.

14. The system of claim 11, wherein the priority logic circuit has a processor and the priority table is implemented in firmware.

15. The system of claim 9, wherein the code is a binary code.

16. The system of claim 9, wherein the first selection element is a first switch element and the second selection element is a second switch element.

17. A method for automatically detecting, selecting, and enabling a signal provided to a receiver that has priority over other signals provided to the receiver, comprising:

detecting one or more source signals provided to the receiver by a plurality of sources;

determining which source signals of the one or more source signals have been detected for a minimum, uninterrupted period of time, wherein if no source signal of the one or more source signals has been detected for the minimum, uninterrupted period of time, then a switch signal from a plurality of source switches is enabled to the receiver;

determining a priority source signal of the source signals that have been detected for the minimum, uninterrupted period of time;

selecting the priority source signal;

determining whether the priority source signal is disabled; and if the priority source signal is not disabled, enabling the priority source signal to the receiver and if the priority source signal is disabled, enabling the switch signal from the plurality of source switches to the receiver.

18. The method of claim 17, wherein after determining which source signals of the one or more source signals have been detected for the minimum, uninterrupted period of time, further comprising:

determining whether the receiver is powered-up; and if the receiver is not powered-up, powering-up the receiver.

19. The method of claim 17, wherein determining the priority source signal comprises passing the source signals of the one or more source signals that have been detected for the minimum, uninterrupted period of time to a priority logic circuit of the receiver that determines the priority source signal.

20. The method of claim 17, wherein selecting the priority source signal is accomplished by a priority source selection element of the receiver according to a priority code indicative of the priority source signal.

21. The method of claim 20, wherein the priority code is generated by a priority logic circuit having a priority table.

22. The method of claim 20, wherein the priority source selection element is a switch element that receives the priority code and the one or more source signals and selects the priority source signal.

23. The method of claim 17, wherein enabling the priority source signal is accomplished by an enabling element of the receiver.

24. The method of claim 23, wherein the enabling element is a switch element that receives a switch signal from a plurality of source switches and the priority source signal from a priority source selection element that selects the priority source signal according to a priority code indicative of the priority source signal.

25. The method of claim 17, wherein if the priority source signal is not disabled, the priority source signal is enabled to a pre-amplification circuit of the receiver and if the priority source signal is disabled, the switch signal is enabled to the pre-amplification circuit of the receiver.

* * * * *